(12) United States Patent
Chen et al.

(10) Patent No.: US 9,115,977 B2
(45) Date of Patent: *Aug. 25, 2015

(54) NEAR-NULL COMPENSATOR AND FIGURE METROLOGY APPARATUS FOR MEASURING ASPHERIC SURFACES BY SUBAPERTURE STITCHING AND MEASURING METHOD THEREOF

(75) Inventors: Shanyong Chen, Changsha (CN); Yifan Dai, Changsha (CN); Shengyi Li, Changsha (CN); Xiaoqiang Peng, Changsha (CN); Chao Xie, Changsha (CN); Yanglin Peng, Changsha (CN)

(73) Assignee: NATIONAL UNIVERSITY OF DEFENSE TECHNOLOGY, Changsha, Hunan (CN)

( * ) Notice: Subject to any disclaimer, the term of this patent is extended or adjusted under 35 U.S.C. 154(b) by 84 days.

This patent is subject to a terminal disclaimer.

(21) Appl. No.: 14/123,962

(22) PCT Filed: Jul. 20, 2012

(86) PCT No.: PCT/CN2012/078965
§ 371 (c)(1),
(2), (4) Date: Dec. 4, 2013

(87) PCT Pub. No.: WO2013/155805
PCT Pub. Date: Oct. 24, 2013

(65) Prior Publication Data
US 2014/0132960 A1 May 15, 2014

(30) Foreign Application Priority Data
Apr. 16, 2012 (CN) .......................... 2012 1 0110946

(51) Int. Cl.
G01B 9/021 (2006.01)
G01M 5/00 (2006.01)
G01M 11/02 (2006.01)
G01B 9/02 (2006.01)

(52) U.S. Cl.
CPC ............ *G01B 9/021* (2013.01); *G01B 9/02039* (2013.01); *G01B 9/02058* (2013.01); *G01B 9/02085* (2013.01); *G01M 5/005* (2013.01); *G01M 11/025* (2013.01); *G01M 11/0271* (2013.01)

(58) Field of Classification Search
CPC .......... G01M 11/0271; G01B 9/02034; G01B 9/02039; G01B 9/02085; G01B 11/164
USPC .................................. 356/457, 458, 513, 514
See application file for complete search history.

(56) References Cited

U.S. PATENT DOCUMENTS

| | | | |
|---|---|---|---|
| 7,072,042 B2 * | 7/2006 | Kim et al. | 356/458 |
| 8,104,905 B2 * | 1/2012 | Schillke et al. | 359/838 |
| 2012/0170038 A1 * | 7/2012 | Bourgois et al. | 356/400 |

*Primary Examiner* — Jonathan Hansen
(74) *Attorney, Agent, or Firm* — Raymond Y. Chan; David and Raymond Patent Firm

(57) ABSTRACT

A variable near-null compensator for measuring aspheric surfaces by subaperture stitching includes a pair of counter-rotating CGH phase plates, each of the phase plates having a phase function including two terms Z5 and Z7 of Zernike polynomials. The phase plates are mounted on a pair of precision rotary center-through tables, wherein rotational axes of the pair of precision rotary center-through tables coincide with the optical axes of the phase plates. A figure metrology apparatus includes a wavefront interferometer, the test mirror mount, the near-null compensator and the mechanical adjustment components therefor. The optical axis of the near-null compensator coincides with the optical axis of the interferometer. A method for measuring aspheric surfaces by subaperture stitching includes the steps of mounting the test mirror, measuring the subapertures with the figure metrology apparatus, and finally processing the data by stitching.

39 Claims, 7 Drawing Sheets

NEAR-NULL COMPENSATOR AND FIGURE METROLOGY APPARATUS FOR MEASURING ASPHERIC SURFACES BY SUBAPERTURE STITCHING AND MEASURING METHOD THEREOF

BACKGROUND OF THE PRESENT INVENTION

1. Field of Invention

The present invention relates to a surface interferometry and more particularly to a variable near-null compensator and a figure metrology apparatus for measuring aspheric surfaces by subaperture stitching interferometry and measuring method thereof.

2. Description of Related Arts

Optical aspheres are widely used in modern optical systems such as telescopes, lithographic objectives and so on. Due to the increase of the requirements for the performances of the modern optical systems, the aspheric surfaces with large caliber and high accuracy become major features in modern optical system. The deviation of the surface figure for an aspheric surface is typically measured by an interferometer. However, the interference fringes on large caliber aspheric surfaces are too dense to be resolved owning to the departure of large aspheric surfaces which can't be tested within the vertically measuring range of the wavefront interferometer. In order to completely resolve the interference fringes on large caliber aspheric surfaces, a compensator is adapted to reshape the spherical test wavefront to match the test aspheric wavefront. The compensator is required to compensate almost all of the aberrations, and as a result, the residuals aberrations have to be less than $1/100$ waves PV (peak-to-valley). Therefore, if the shape of the aspheric surface generates a slight change, the structure of the compensator usually is required to be re-designed. In other words, one type of compensator only can be used for a certain type of aspheric surface. Furthermore, the convex aspheric surface reflectors which are used as secondary mirrors in telescopes usually comprise a compensator with aspheric surfaces, in such manner that, the manufacturing cost and complexity of such telescopes are higher. Due to the limitations of the materials and the manufacturing accuracy of the compensator, it is generally not suitable for large-caliber aspheric surfaces reflector.

China Patent Number, CN101251435A, entitled as "Subaperture Stitching Workstation for Large Optical Surfaces", discloses a subaperture stitching workstation composed of an interferometer, a five degree-of-freedom adjustment platform for the interferometer, and a tip-tilt platform for the test mirror. The workstation is mainly applied to the subaperture measurement for large optical surfaces. The subaperture stitching interferometry is adapted by the workstation. A series of mutually overlapping subapertures located at different positions on the test mirror are measured one by one and provide a surface figure deviation of the full aperture by the subasperture stitching algorithm. No null optics, such as compensator, is required and mild-slope of aspheric surfaces (which has a lower slope of asphericity) are able to be measured directly so as to extend measurable apertures thereof. However, subapertures are required to cover the full aperture of the aspheric test mirror and the asphericity of each subaperture must be reduced to be small enough to ensure that the departure of such aspheric test mirror is within the vertically measuring range of the interferometer, so that the interference fringes can be easily resolved by the interferometer. Therefore, this method is not applicable to high-slope aspheric surfaces (which has a higher slope of asphericity). Otherwise, the large aperture aspheric surfaces must be divided into hundreds of subapertures so as to sufficiently reduce the departure of the subapertures thereof, such that the problem of the environmental disturbance and lower measurement repeatability are generated. As demonstrated by inventors, Chen and Dai, in the "Calculation of subaperture aspheric departure in lattice design for subaperture stitching interferometry" (Optical Engineering, vol. 49/2 (2010) pp. 023601-1~5), up to 142 subapertures may be required to test a 360 mm aperture convex aspheric surface with a 4-inch subaperture interferometer.

To effectively reduce the number of subapertures and the complexity of the measurement, a near-null compensator can be introduced to the subaperture stitching interferometry, wherein the near-null compensator is different from conventional null compensator. The near-null compensator is required to compensate most of the aberrations of subaperures such that the residual aberrations reduced within the vertically measuring range of a standard interferometer (for example, 10 waves PV). However, different subapertures located at different positions on aspheric surfaces will generate different ranges of aberrations, so that the near-null compensator is required to be adjustable to match the different ranges of aberrations.

China Patent CN1587950A, entitled as "An interferometric method for aspheric surface metrology using partial compensation lens", discloses a compensator having refractive lens for partially compensating the departure of aspheric surfaces. It is not applicable to off-axis subapertures on the aspheric surfaces. Moreover the compensator can't be adjusted to compensate the different ranges of aberrations.

China Patent CN1746648A, entitled as "A test system for large steep aspheric surfaces", discloses a compensator having partially compensating lens which is used to test annular subapertures. In this manner, the large aperture and high-slope aspheric surface with large amount of annular subapertures can be tested. However, the method also can not be applicable to off-axis subapertures on the aspheric surfaces, but it is applicable to rotationally symmetric concave aspheric surfaces.

In addition, United States Patent Publication No. 2009/0251702 A1 published on Oct. 8, 2009, provided by the inventors, Murphy, Devries, Brophy and Forbes, entitled as "Stitching of near-nulled subaperture measurements", and the reference document entitled as "Subaperture stitching interferometry of high-departure aspheres by incorporating a variable optical null" (CIRP Annals-Manufacturing Technology, vol. 59/3 (2010), pp. 547-550) provided by QED Technologies Inc., suggest a metrology system and method for measuring aspheric surfaces by subaperture stitching. The method discloses a variable near-null compensator comprising a pair of Risley prism which is mutually counter-rotating to generate variable amounts of coma and astigmatism. In other words, the pair of Risley prisms can be tilted to compensate most of the subaperture aberrations. Hence, the variable near-null compensator can be adjusted to compensate most of the aberrations. The shortcoming of the above mentioned method is that the need of adjustment the counter-rotating and tilting angles so as to tight the accuracy of the mechanical alignment. Moreover, the spaces between the interferometer and the test mirror surface need to be reserved under the overall tilt (probably up to 40 degrees) so as to generate the hassle for arranging the testing optical path.

According to a document published by Acosta and Bard (Acosta E., et al., "Variable aberration generators using rotate Zernike plates", J. Opt. Soc. Am. A, vol. 22/9 (2005), pp. 1993-1996), variable amounts of pure Zernike modes can be generated by rotating a pair of Zernike phase plates, which can be used to calibrate ocular aberrometers. This idea has not been realized for optical figure metrology because the aberration of the aspheric surfaces requires to be completely compensated. Different aspheric surfaces require different types of compensators or computer-generated holograms (CGHs) with different phase functions so that only one CGH phase plate is required to compensate a single-fixed aberration. Utilizing a pair of CGH plates generates the problems of the increase of disturbance orders of diffraction, and reduces efficiency of diffraction. The problems as mentioned above must be carefully solved by other techniques. Besides, when using a pair of counter-rotating phase plates for optical figure metrology, the method for designing the phase function is different from conventional CGH design. However, the conventional CGH design is based on a single-fixed phase, wherein the phase function of the conventional CGH design is determined by the difference of the aspheric wavefront propagating to the phase plate and the emerging wavefront expected to converge to an ideal image point. While using a pair of phase plates, the phase function is not well defined by the aspheric and emerging wavefronts because the phase plates do not completely compensate the aberrations of all subapertures. The phase plates have to compensate most of aberrations of different subapertures located at different positions on aspheric surface with different slopes. Therefore, a new CGH design method is required for defining the phase function.

SUMMARY OF THE PRESENT INVENTION

The present invention aims to overcome some shortcomings of current techniques and provides a near-null compensator of compact design and with improved practicability and maneuverability for measuring aspheric surfaces by subaperture stitching. The present invention further provides a figure metrology apparatus for measuring aspheric surfaces by subaperture stitching with simple configuration, compact design, low in cost, high in accuracy and high in flexibility. The present invention also provides a method for measuring aspheric surfaces by subaperture stitching with the figure metrology apparatus.

To solve the above technical problems, the present invention provides a variable near-null compensator for subaperture stitching interferometry of aspheres (especially convex aspheres). The near-null compensator comprises a pair of counter-rotating CGH phase plates. The phase function of the phase plate comprises two terms Z5 (astigmatism at 45 degrees and defocusing) and Z7 (coma and y-tilt) of Zernike polynomials:

$$\begin{cases} aZ_5 = a\rho^2\sin(2\theta) \\ bZ_7 = b(3\rho^2 - 2)\rho\sin\theta \end{cases};$$

Wherein, $\rho$ is defined as a normalized radial of the pupil coordinate, and $\theta$ is defined as an angular angle of the pupil coordinate, wherein a is a coefficient of $Z_5$ polynomial and b is a coefficient of $Z_7$ polynomial. In other words, the coefficients of Z5 of the two counter-rotating phase plates 11 are contrary numbers and the coefficients of $Z_7$ of the two counter-rotating phase plates 11 are contrary numbers. In such manner, the coefficient a and b are determined by an aberration of an off-axis subapertures (the off-axis direction is x-direction and the aberration can be calculated by Zemax model). The phase plates are mounted on a pair of precision rotary center-through tables (the center aperture of the rotary center-through table is not less than the effective aperture of the phase plates), wherein the rotational axis of the precision rotary center-through table coincides with the optical axes of the phase plates.

The aberrations for different subapertures with different off-axis distances on the aspheric test mirror are calculated, wherein the coefficients of Zernike polynomials $Z_4$ (astigmatism at 0 degrees and defocusing) and $Z_6$ (coma and x-tilt) are obtained, and $x_i$ and $y_i$ are defined as half of $Z_4$ and $Z_6$, where $i=1, 2, \ldots, n$ is the number of subapertures. Solving the below nonlinear equations to get the coefficient $x_0$ and $y_0$ of the phase function, and rotating angle $\gamma_i$, $$\begin{cases} x_i = 2x_0\sin(2\gamma_i) \\ y_i = 2y_0\sin(\gamma_i) \end{cases} \quad i = 1, 2, \ldots n;$$

wherein, $x_0$ and $y_0$ which are the coefficients of Z5 and Z7 polynomials of the phase function of one phase plate, respectively, wherein $\gamma_i$ is the clockwise rotating angle of the phase plate around its optical axis while measuring subaperture i. Contrary numbers are used for the other phase plate, such that the coefficients of $Z_5$ and $Z_7$ polynomials for the other phase plate are −x0 and −y0 and the counter-clockwise rotating angle for the other phase plate around its optical axis is γi. Practically, the rotating angles need be finely tuned to further reduce the residual aberration of subapertures, according to the accurate optical design model. When the near-null compensator is applied to another aspheric test mirror with different surface figure, most of off-axis subaperture aberrations can still be compensated by properly arranging the subaperture layout and adjusting the counter-rotating angles of the phase plates while the phase function of the phase plates keeps unchanged.

The preferred embodiment of the present invention provides a figure metrology apparatus for measuring aspheric surfaces by subaperture stitching comprising a wavefront interferometer, a mechanical adjustment component for the interferometer, a test mirror mount, a mechanical adjustment component for the test mirror, a near-null compensator, and a mechanical adjustment component for the near-null compensator. The wavefront interferometer is mounted on the mechanical adjustment component for the interferometer. The test mirror mount is mounted on the mechanical adjustment component for the test mirror. The near-null compensator is mounted on the mechanical adjustment component for the near-null compensator and is located between the wavefront interferometer and the test mirror mount. The rotational axis of the precision rotary center-through tables coincides with the optical axis of the wavefront interferometer.

More particularly, the mechanical adjustment component for the interferometer thereof preferably comprises a spatially orthogonal three-axis translation stage and a yawing table mounted on the translation stage. The three-axis translation stage has digital display for displaying the amount of the three-axis translation and is driven by a stepping motor or a servo motor. The yawing table has digital display for displaying the yawing angle and is driven by a stepping motor or a servo motor.

More particularly, the near-null compensator is preferably mounted on the mechanical adjustment component for the near-null compensator. The mechanical adjustment component for the near-null compensator which is mounted on the yawing table comprises a translation stage along the direction of the optical axis of the wavefront interferometer. The translation stage has digital display for displaying translation amounts and is driven by a stepping motor or a servo motor.

More particularly, the mechanical adjustment component for the test mirror preferably comprises a precision rotary table, wherein the rotational axis of the precision rotary table coincides with the optical axis of the test mirror mounted on the test mirror mount. The precision rotary table has digital display for displaying the rotating angle and is driven by a servo motor.

The present invention further provides a method for measuring aspheric surfaces by subaperture stitching with the figure metrology apparatus which comprises the steps of:

(1) Mounting the test mirror: The aspheric test mirror is divided into a certain number of overlapping subapertures and then mounted on the test mirror mount;

(2) Measuring individual subaperture: By adjusting the mechanical adjustment component for the interferometer, the mechanical adjustment component for the near-null compensator, and the mechanical adjustment component for the test mirror, the test beam emitted from the wavefront interferometer is aligned to illuminate an individual subaperture of the test mirror after passing through the near-null compensator. Then by counter-rotating the precision rotary center-through tables, the counter-rotating angles of the phase plates are adjusted and the near-null compensator generates certain amounts of coma and astigmatism, which correct most of the subaperture aberrations. Therefore, the residual aberration is reduced within the vertical range of measurement of the wavefront interferometer (for example, 10λ PV, where λ is wavelength of the interferometer source). The records of the motion axes parameters of all mechanical adjustment components are saved along with the data of subaperture measurements;

(3) Measuring subapertures one by one: According to step (2), all other subapertures at different locations on the aspheric test mirror are measured;

(4) Stitching: According to the saved motion axes parameters and data of subaperture measurements during steps (2) and (3), the subaperture data are processed with a stitching algorithm and yield the deviation of the surface figure of the aspheric test mirror.

According to the above steps (2) and (3), the rotating angles of two phase plates are kept consistent but with opposite directions.

More particularly, the processing method of the subaperture data preferably comprises steps of: (1) Recognizing the mathematical relation between the subaperture measurements and the sum square of the overlapping deviations by combining the ray tracing and rigid-body transformation; and (2) Determining the optimal six degrees-of-freedom configuration parameters and the power coefficients so as to minimize the sum square of the overlapping deviations by iterative optimization. The surface figure of the aspheric test mirror is hence obtained.

More particularly, the measurement of individual subapertures applies for the central subaperture or certain off-axis subaperture.

More particularly, while multiple subapertures are being measured, the measurement of subapertures are applied one by one in an order of increasing distance from the center of the subaperture to the optical axis of the test mirror, one by one and cycle by cycle.

The present invention is based on an extension of the following technical idea: Based on the rotational properties of Zernike polynomials, variable amounts of coma and astigmatism are generated by a pair of counter-rotating phase plates with phase function defined by superimposing two terms Z5 (astigmatism at 45 degrees and defocusing) and Z7 (coma and y-tilt) of Zernike polynomials, which compensate most aberrations of off-axis subapertures located at different positions of aspheres with different surface shape. By adjusting the multi-axis mechanical adjustment components, the test beam emitted from the wavefront interferometer is aligned to illuminate the subaperture of the test mirror after passing through the phase plates, which enables the near-null subaperture testing. By iterative optimization, the six degrees-of-freedom configuration parameters and the power coefficients are best recognized to minimize the sum square of the overlapping deviations so as to finally give a best estimation of the deviation of the surface figure of the aspheric test mirror.

Comparing with the prior art, the present invention has the following advantages:

1. The near-null compensator generates variable amounts of coma and astigmatism to compensate most aberrations of off-axis subapertures located at different positions of aspheres of different shapes by a pair of counter-rotating Zernike phase plates. It is essentially different from conventional technique employing a Risley prism pair. Because only the rotating angle need be adjusted, the near-null compensator is low cost, easy to be aligned and compact to fit the short space between the interferometer and the test mirror, and with improved practicability and maneuverability.

2. The Zernike phase plate of the near-null compensator can be realized by CGH, wherein the main pattern of CGHs can be used for aberration compensation, and other alignment patterns are also easily to be fabricated on the same substrate to facilitate alignment of the phase plate with regard to the wavefront interferometer, and alignment of the initial position of two phase plates, and then improve the measuring accuracy.

3. Due to the arrangement of the near-null compensator, the structure of the figure metrology apparatus is simpler and more compact, and the near-null compensator requires smaller space for mounting and manipulating. The motion system is also simplified with reduced cost. Elimination of overall tilt of the near-null compensator also avoids the problem of circular pupil distortion.

4. Compared with conventional technique, the near-null subaperture testing requires totally eight numerically controlled axes which are three axes less than the conventional technique. The iterative stitching algorithm combining ray tracing and rigid-body transformation can compensate the effect of six degrees-of-freedom configuration errors within a large range so as to relax the motion tolerance of the numerically controlled axes.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

In order to show and describe the purposes and skills of the present invention, below combines preferred embodiments and drawings, and further illustrates the functional and structural principle of the present invention.

First Preferred Embodiment

Figure 1:
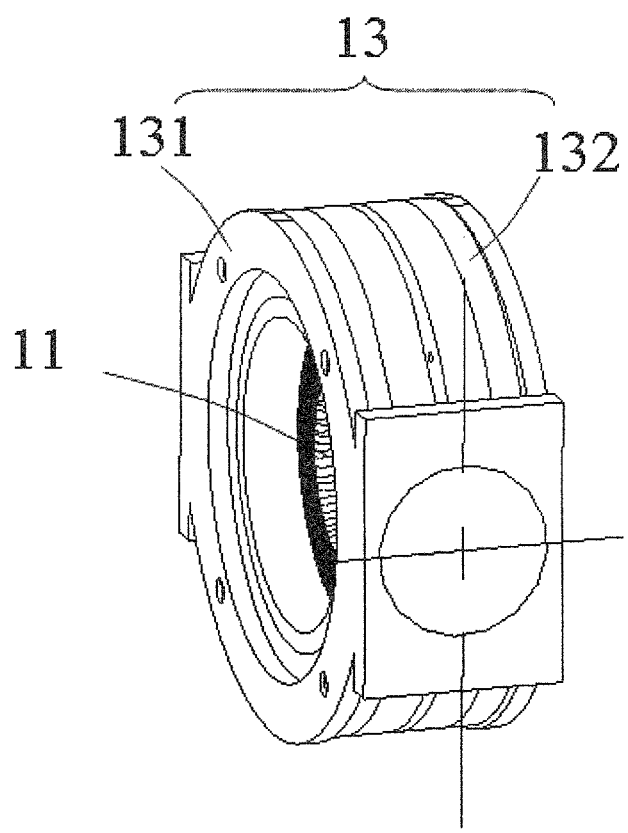
FIG. 1 is a perspective view illustrating a near-null compensator according to a first preferred embodiment of the present invention.
Figure 2:
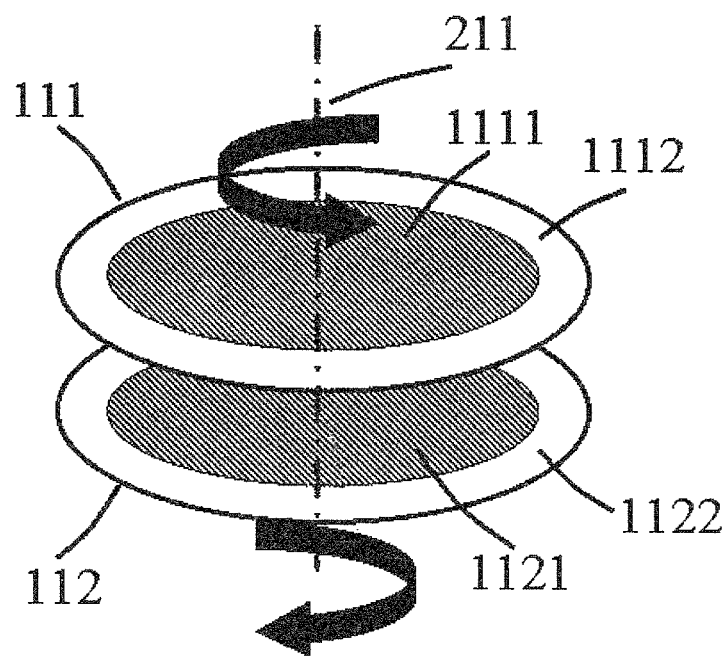
FIG. 2 is a schematic diagram of two counter-rotating phase plates of the near-null compensator according to the first preferred embodiment of the present invention.

As shown in FIG. 1 to FIG. 2 of the drawings, a near-null compensator 1 adapted for measuring a aspheric surface via subaperture stitching interferometry according to a preferred embodiment of the present invention is illustrated, wherein the near-null compensator 1 comprises a pair of counter-rotating computer generated holograms (CGH) phase plates 11, defined as a first phase plate 111 and a second phase plate 112. Moreover, each of the phase plates (CGH) 11 comprises a phase function having two terms $Z_5$ (45 degrees to direction of the astigmatism and defocusing) and $Z_7$ (coma and y-tilt) of Zernike polynomials, as shown in below:

$$\begin{cases} aZ_5 = a\rho^2\sin(2\theta) \\ bZ_7 = b(3\rho^2 - 2)\rho\sin\theta \end{cases}$$

wherein, $\rho$ is defined as a pupil coordinate of a normalized radial, and $\theta$ is defined as an pupil coordinate of an angular angle, wherein a is a coefficient of $Z_5$ polynomial and b is a coefficient of $Z_7$ polynomial. In other words, the coefficients of Z5 of the two counter-rotating phase plates 11 are contrary numbers and the coefficients of $Z_7$ from each of the two counter-rotating phase plates 11 are contrary numbers. In such manner, the coefficients a and b are determined by an aberration of an off-axis subapertures (the off-axis direction is x-direction). Accordingly, the phase function of the first phase plate 111 and the second phase plate 112 are shown in below:

$$\begin{cases} W_5 = 50.2392 & \lambda\rho^2\sin(2\theta) \\ W_7 = 16.4955 & \lambda(3\rho^2 - 2)\rho\sin\theta \end{cases}$$

(the phase function of the first phase plate)

$$\begin{cases} W'_5 = -50.2392 & \lambda\rho^2\sin(2\theta) \\ W'_7 = -16.4955 & \lambda(3\rho^2 - 2)\rho\sin\theta \end{cases}$$

(the phase function the second phase plate)

Accordingly, a pair of the phase plates (CGH) 11, defined as the first phase plate 111 and the second phase plate 112, relatively installed on a pair of precision rotary center-through tables 13 (which defined as a first precision rotary center-through table 131 and a second precision rotary center-through table 132), and the phase plate 11 can be installed within the hollow hole of the precision rotary center-through tables 13, as an example. In such manner, the mounted order of the phase plates is consistent with their rotating directions, and the repeatability of the precision rotary center-through table 13 must be less than 1 arc minute. Optical axes of a pair of phase plate 11 coincide with rotational axes of the precision rotary center-through tables 13. Therefore, the rotary angles can display on the precision rotary center-through tables 13 via digital display being actuated by a servo motor or a stepping motor, wherein the motor can drive the rotation motion of the precision rotary center-through tables 13 via a flexible coupler and worm gear mechanism.

Figure 3:
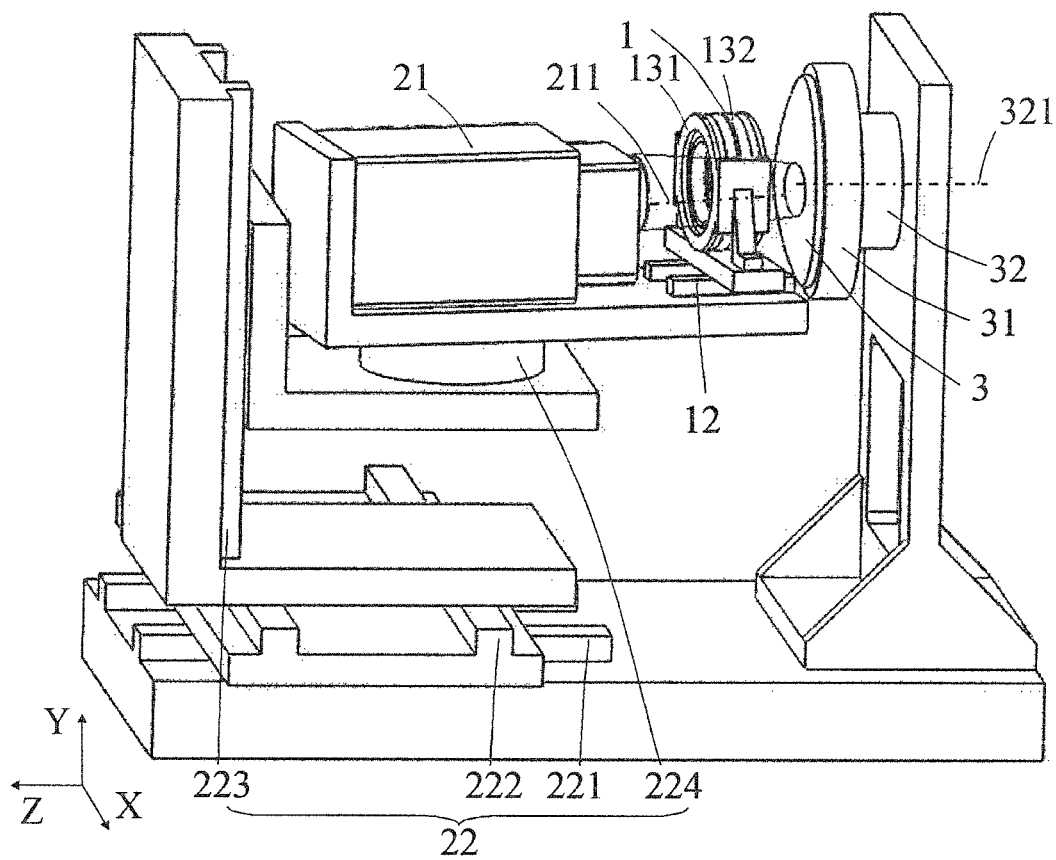
FIG. 3 is a perspective view illustrating a figure metrology apparatus according to the first preferred embodiment of the present invention.

As shown in FIG. 3 of the drawings, a figure metrology apparatus for measuring aspheric surfaces by subaperture stitching according to the preferred embodiment of the present invention is illustrated, wherein the figure metrology apparatus comprises a wavefront interferometer 21, a mechanical adjustment component for the wavefront interferometer 22, an test mirror mount 31 adapted to support a aspheric test mirror 3, an mechanical adjustment component for the test mirror 32, a near-null compensator 1, and a mechanical adjustment component for the near-null compensator 12, wherein the wavefront interferometer 21 is installed on the mechanical adjustment component for the wavefront interferometer 22, wherein the test mirror mount 31 is mounted on the mechanical adjustment component for the test mirror 32, wherein the near-null compensator 1, installed on the mechanical adjustment component for the near-null compensator 1, is mounted in a position between the wavefront interferometer 21 and the test mirror mount 31 such that the rotational axis of the precision rotary center-through tables 13 coincide with an optical axis 211 of the wavefront interferometer 21.

In the figure metrology apparatus of the preferred embodiment of the present invention, the mechanical adjustment component for the wavefront interferometer 22 mainly comprises a spatially orthogonal three-axis translation stage and a yawing table 224 mounted on the three-axis translation stage. The three-axis translation stage comprises a Z-axis component 221 translating along the optical axis 211 (while the figure metrology apparatus is on the beginning position, the optical axis 211 is parallel to the Z-axis direction), a X-axis component 222 arranged on the Z-axis component 221 and translating along X-axis direction (horizontal direction), and a Y-axis component 223 mounted on the X-axis component and translating along Y-axis direction (vertical-direction). The yawing table 224 mainly rotates around the Y-axis direction. Z-axis component 221, X-axis component 222, and Y-axis component 223 each comprises a digital display for displaying the translating amount of each component, wherein the yawing table 224 is driven by the stepping motor or the servo motor. In such manner, the three-axis translation stage can be driven to do the translational movement by the motor via the flexible coupler, ball screw and linear guide assembly, wherein the position accuracy is better than 0.1 mm. The yawing table 224 comprises a digital display for displaying the reflecting angle and is driven by the stepping motor or the servo motor, in such manner that the yawing table 224 can be activated to do the rotational movement by the motor via the flexible coupler or worm gear mechanism such that the accuracy of the repeatability of the yawing table is not less than 3 arc minutes.

In the figure metrology apparatus of the preferred embodiment of the present invention, the mechanical adjustment component for the near-null compensator 12 is mounted under the near-null compensator 1, that is to say, the near-null compensator 1 is mounted on the mechanical adjustment component for the near-null compensator 12, wherein the mechanical adjustment component for the near-null compensator 12 mounted on the yawing table 224 comprises a translation stage which is moving along the direction of the optical axis 221 of the wavefront interferometer 21. The translation stage comprises a digital display for showing the translation amount thereof, wherein the translation stage is activated by the stepping motor or the servo motor, in such manner that the translation stage can be driven to do the translational movement by the motor via the flexible coupler, ball screw and linear guide assembly while the position accuracy of the translation stage is better than 0.1 mm.

In the figure metrology apparatus according to the preferred embodiment of the present invention, the mechanical adjustment component for the test mirror 32 mainly comprises a precision rotary table, wherein the rotational axis of the precision rotary table coincides with an optical axis of an aspheric test mirror 3 installed on the test mirror mount 31. The precision rotary table comprises a digital display for displaying the rotary angle thereof, wherein the precision rotary table is activated by the stepping motor or the servo motor, in such manner that the precision rotary table can be driven to do the rotational movement by the motor via the flexible coupler and worm gear mechanism while the accuracy of the repeatability for the rotational movement of the precision rotary table is not less than 3 arc minutes.

Moreover, the near-null compensator 1 and the mechanical adjustment component of the near-null compensator 12 are screwed on the yawing table 224 arranged under the wavefront interferometer 21, such that the mechanical adjustment component for the wavefront interferometer 22 provided under the wavefront interferometer 21 can adjust the position of the near-null compensator 1 and the position of the mechanical adjustment component of the near-null compensator 12. Therefore, different types of aspheric test mirrors 3 requires to use different lens for the wavefront interferometer 21 with different f/numbers, such that the relative position of the near-null compensator 1 and the wavefront interferometer 21 can be adjusted along the direction of the optical axis 211 by the mechanical adjustment component of the near-null compensator 12 before subaperture testing. During the subaperture testing process, the relative position of the near-null compensator 1 and the wavefront interferometer 21 keep consistent. In the optical layout, the near-null compensator 1 is located between the wavefront interferometer 21 and the aspheric test mirror 3.

Figure 4:
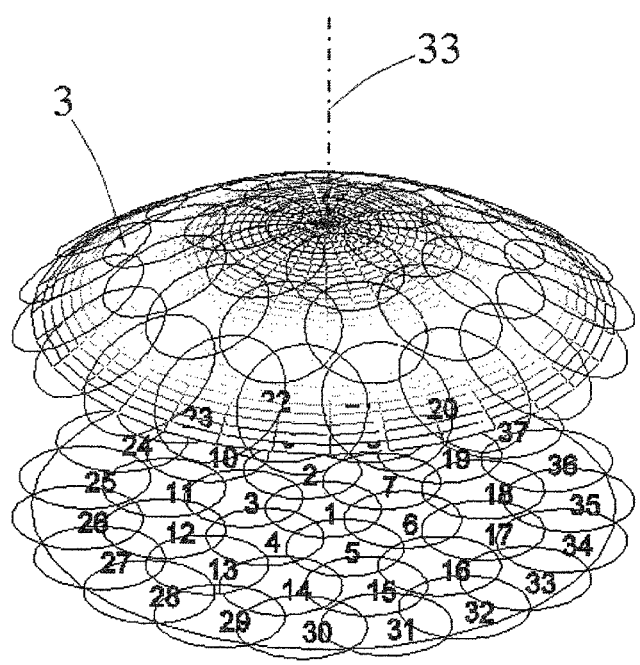
FIG. 4 illustrates the distribution position of subapertures on the aspheric convex test mirror according to the first preferred embodiment of the present invention.

The following shows the subaperture stitching testing for a convex hyperbolic SiC mirror with a 4-inch aperture interferometer as an example, and further describes the functional and structural principles of the near-null compensator 1 according to the preferred embodiment of the present invention, wherein the above subaperture stitching testing comprises the following steps:

(1) Select appropriate lens for the wavefront interferometer 21 based on the geometry of test surfaces so as to estimate the size of the subaperture and determine the position of the off-axis subapertures by the overlapping regions of the subapertures. In the preferred embodiment of the present invention, the aspheric test mirror 3 is a convex hyperbolic SiC mirror which has quadratic constant equal to −2.1172, radius of curvature at vertex equal to 772.48 mm, and aperture size equal to 360 mm, wherein the wavefront interferometer 212 is taken with the f/10.7 and the size of the subaperture is approximately 72 mm. In such manner, the off-axis distance of subapertures is defined as $d_0$, and the angle between the normal of the center of the subaperture and the optical axis 33 is defined as $\alpha$. FIG. 4 shows the distribution position of subapertures on the aspheric test mirror 3 according to the preferred embodiment of the present invention. There are three circles of off-axis subapertures, and the total number of the subapertures is thirty seven which includes a central subaperture. The three circles of off-axis subapertures, defined as an inner circle off-axis subaperture, a middle circle subaperture, and an outmost circles subaperture, are angularly evenly distributed and the distribution angles of subaperture for each circles which are respectively 60°, 30° and 20° degrees. In other words, three circles of off-axis subapertures are surrounding around the optical axis 33 based on the distribution angle. In addition, the off-axis distance $d_0$ from inner circle to outmost off-axis subaperture are respectively 51.1821 mm, 102.0609 mm and 152.3380 mm, the $\alpha$ value from inner circle to outmost circle off-axis subaperture are 3.8°, 7.6° and 11.4° degrees. Due to the rotational symmetry, the aberration of subapertures from each subaperture of each circle is identical (The distances from the center of each subaperture from each circle to the optical axis of the aspheric test mirror are equal). Therefore, the aberrations of the three off-axis subaperture along the x-direction within three circles of off-axis subapertures need to be calculated.

Figure 5:
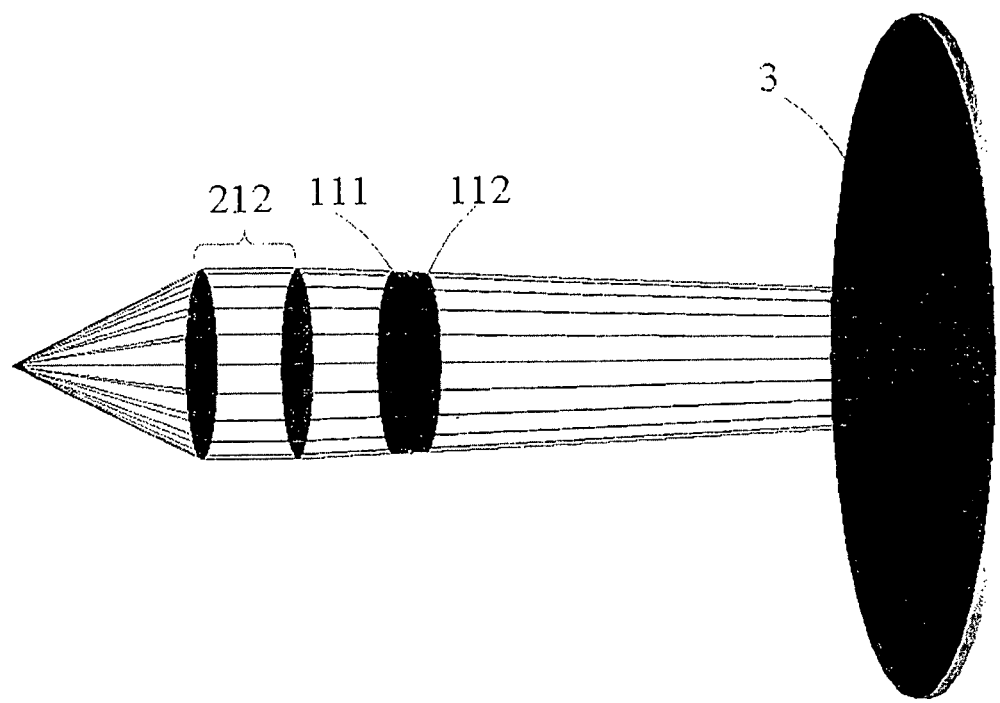
FIG. 5 illustrates the Zemax model for calculating the subaperture aberrations within an aspheric convex test mirror according to the first preferred embodiment of the present invention.
Figure 9:
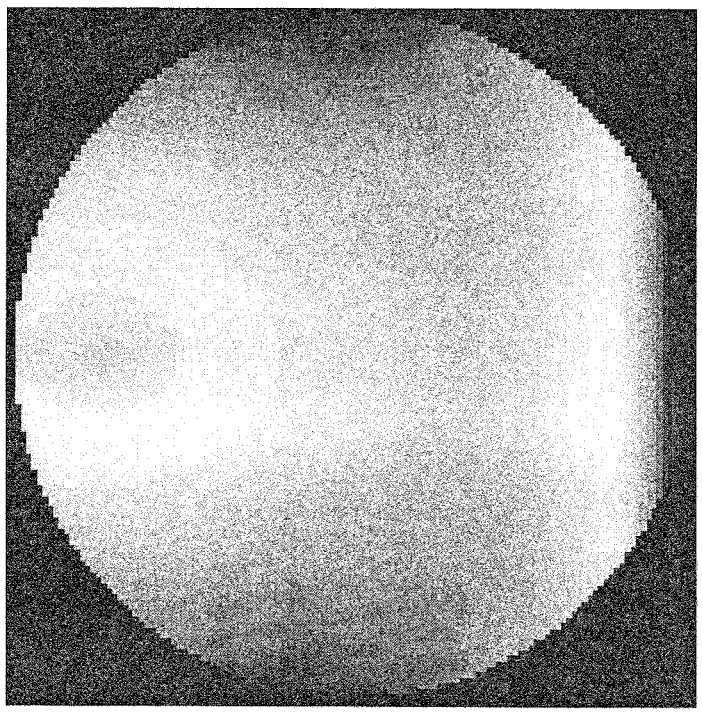
FIG. 9 illustrates the initial subaperture aberration of the inner circle on the aspheric convex asphere according to the first preferred embodiment of the present invention.
Figure 9:
Figure 10:
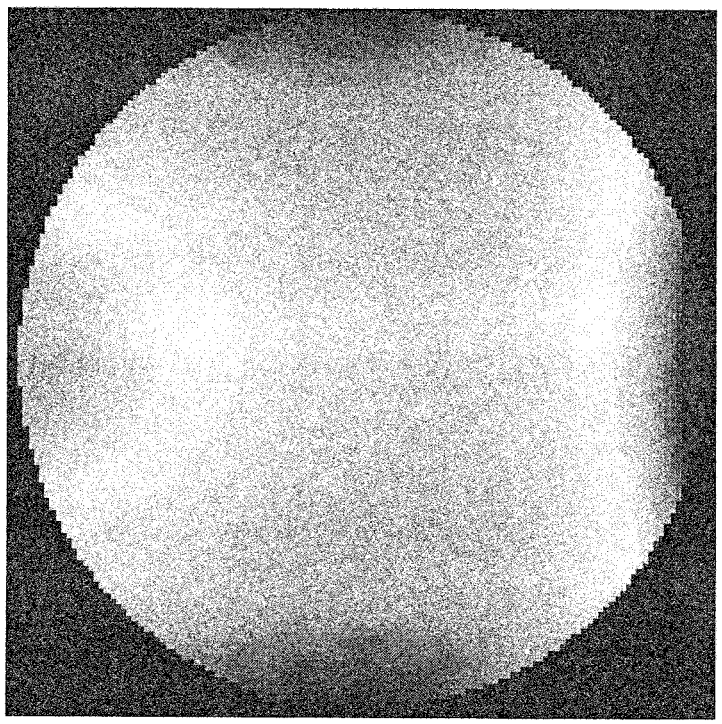
FIG. 10 illustrates the initial subaperture aberration of the middle circle on the aspheric convex asphere according to the first preferred embodiment of the present invention.
Figure 10:
Figure 11:
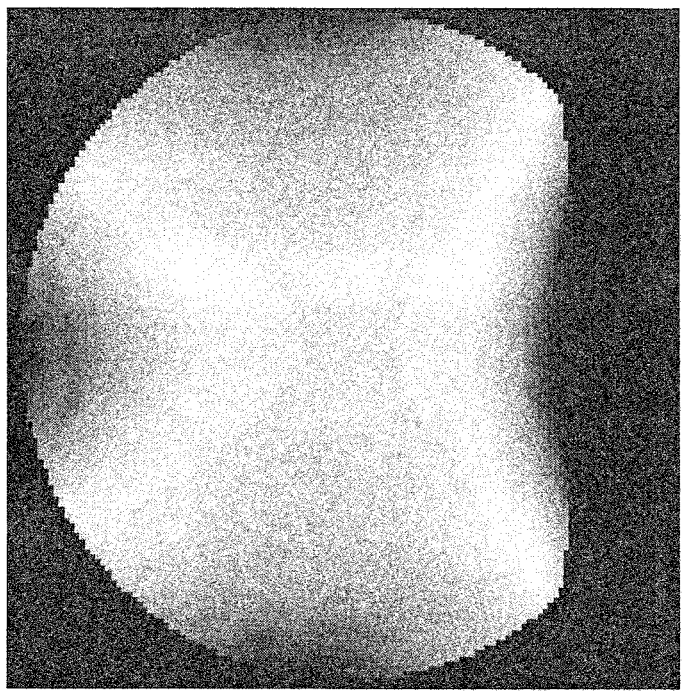
FIG. 11 illustrates the initial subaperture aberration of the outmost circle on the aspheric convex asphere according to the first preferred embodiment of the present invention.
Figure 11:
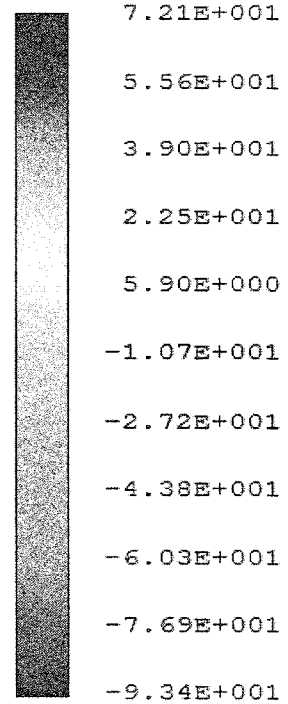

(2) Establish a Zemax model for the aspheric off-axis subaperture, as shown in FIG. 5, wherein the first phase plate 111 and the second phase plate 112 of the near-null compensator 1 (as Zernike) are modeled by Zernike Fringe Phase model while the phase function of each phase function is temporarily set up as zero and the caliber is set up as 100 mm. The respective aberration of the three circles off-axis subaperture, as shown in FIG. 4, can be calculated by the Zemax software which respectively shows in FIG. 9, FIG. 10, and FIG. 11. In addition, the aberrations of subapertures mainly composed of two terms $Z_4$ (0 degrees to astigmatism and defocusing) and $Z_6$ (coma and x-tilt) of Zernike polynomial, as shown below:

$$Z_4 = \rho^2 \cos(2\theta), Z_6 = (3\rho^2 - 2)\rho \cos\theta$$

Therefore, the coefficient which is corresponding to $Z_4$ being calculated from three circles off-axis subaperture are 10.98095λ, 44.28098λ, and 100.58339λ, and the coefficient which is corresponding to $Z_6$ are 4.60648λ, 9.53234λ, and 15.18158λ. (λ is 632.8 nm defined by the wavelength of the light source of the wavefront interferometer)

(3) Repeat the above mentioned step (1) and (2) for measuring the different shape of aspheric test mirror if testing needed, and calculate the coefficients which are corresponding to $Z_4$ and $Z_6$ from the aberration of the off-axis subaperture. Moreover, in one hand, the present invention can support two other types of mirror. One is a high-order convex aspheric surface which has quadratic constant equal to zero, radius of curvature at vertex equal to 1023.76 mm, caliber equal to 320 mm, the coefficient of the $4^{th}$ order equal to $-1.868\times10^{-10}$ and the coefficient of the power of six equal to $-5.48\times10^{-16}$. The other is a convex hyperboloid mirror which is a secondary mirror of the stratospheric observatory for infrared astronomy telescope (SOFIA), and has quadratic constant equal to $-1.280$, radius of curvature at vertex equal to 954.5 mm, and caliber equal to 352 mm. The high-order convex aspheric surface utilizes the three circles off-axis subaperture, wherein the coefficient of three circles of off-axis subapertures which are corresponding to $Z_4$ are $2.48578\lambda$, $10.53178\lambda$, and $26.04423\lambda$, and the coefficient thereof which are corresponding to $Z_6$ are $1.13212\lambda$, $2.46846\lambda$, and $4.27858\lambda$. In addition, the SOFIA telescope requires four circles off-axis subaperture, such that the coefficient from each circle which are corresponding to $Z_4$ are $1.52730\lambda$, $6.14077\lambda$, $13.93439\lambda$, and $25.06296\lambda$, and the coefficient therefrom which are corresponding to $Z_6$ are $0.74972\lambda$, $1.51202\lambda$, $2.30449\lambda$ and $3.15429\lambda$.

(4) Solve the below nonlinear equations to get the coefficient $x_0$ and $y_0$ of the phase function, and rotating angle $\gamma_i$, $$\begin{cases} x_i = 2x_0\sin(2\gamma_i) & i = 1, 2, \ldots n \\ y_i = 2y_0\sin(\gamma_i) \end{cases};$$

wherein, the value of $x_i$ being substitute into the above equation are the half value of the coefficient of $Z_4$ which are calculated from the step (2) and step (3), so that the value of $x_i$ being substitute into the above equation for the convex hyperbolic SiC mirror are $5.4905\lambda$, $22.1405\lambda$, and $50.2917\lambda$; the value of $x_i$ being substitute into the above equation for the high order aspheric object are $1.2429\lambda$, $5.2659\lambda$, and $13.0221\lambda$; and the value $x_i$ being substitute into the above equation for the convex hyperboloid mirror (secondary mirror of the SOFIA telescope) are $0.7637\lambda$, $3.0704\lambda$, $6.9672\lambda$, and $12.5315\lambda$;

wherein the value of $y_i$ being substitute into the above equation are the half value of the coefficient of $Z_6$ which are calculated from the step (2) and step (3), and the value of $y_i$ being substitute into the above equation for the convex hyperbolic SiC mirror are $2.3032\lambda$, $4.7662\lambda$, and $7.59082\lambda$, the value of $y_0$ being substitute into the above equation for the high order aspheric object are $0.5661\lambda$, $1.2342\lambda$, and $2.13932\lambda$ and the value of y, being substitute into the above equation for the convex hyperboloid mirror (secondary mirror of the SOFIA telescope) are $0.3749\lambda$, $0.7560\lambda$, $1.1522\lambda$, and $1.5771\lambda$. As a result, $x_0$ can be calculated as $50.2392\lambda$, and $y_0$ can be calculated as $16.4955\lambda$. Thus, the valve of $\gamma_i$ can be determined as $1.6308°$, $6.4176°$, and $14.9618°$ for the hyperbolic convex SiC mirror, $0.3709°$, $1.5191°$, and $3.7096°$ for the high order convex aspheric surface, and $0.2291°$, $0.8872°$, $1.9806°$, and $3.5601°$ for the convex hyperboloid mirror (secondary mirror of the SOFIA telescope). Accordingly the residual, defined by the equation of $\sqrt{[x_i-2x_0\sin(2\gamma_i)]^2+[y_i-2y_0\sin(\gamma_i)]^2}$ is confirmed to be less than 2 waves for each subaperture.

(5) Input the phase function of the phase plate in the Zemax measurement model of the aspheric off-axis subaperture, as shown in FIG. 5. The coefficients of Zernike polynomial for the first phase plate 111 are Zernike $6=50.2392\lambda$ (corresponding to the $Z_5$ of the Zernike polynomials) and Zernike $8=16.4955\lambda$ (corresponding to the $Z_7$ of the Zernike polynomial), such that the phase function of the first phase plate 111 is $W_5+W_7$, as shown in below functions:

$$\begin{cases} W_5 = 50.2392 & \lambda\rho^2\sin(2\theta) \\ W_7 = 16.4955 & \lambda(3\rho^2-2)\rho\sin\theta \end{cases}$$

The coefficient of the phase function of the second phase plate 112 are contrary numbers of the coefficient of the phase function of the first phase plate 111, so that Zernike $6=-50.2392\lambda$ and Zernike $8=-16.4955\lambda$ for the coefficient of the second phase plate 112. Therefore, the phase function of the second phase plate 112 is $W_5'+W_7'$:

$$\begin{cases} W_5' = -50.2392 & \lambda\rho^2\sin(2\theta) \\ W_7' = -16.4955 & \lambda(3\rho^2-2)\rho\sin\theta \end{cases};$$

Figure 7:
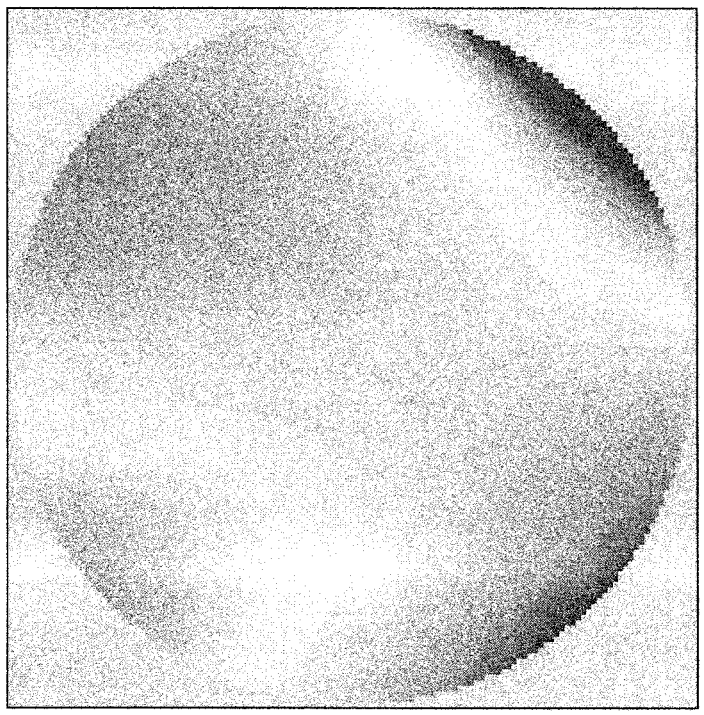
FIG. 7 illustrates the phase function of the first Zernike phase plate according to the first preferred embodiment of the present invention.
Figure 7:
Figure 8:
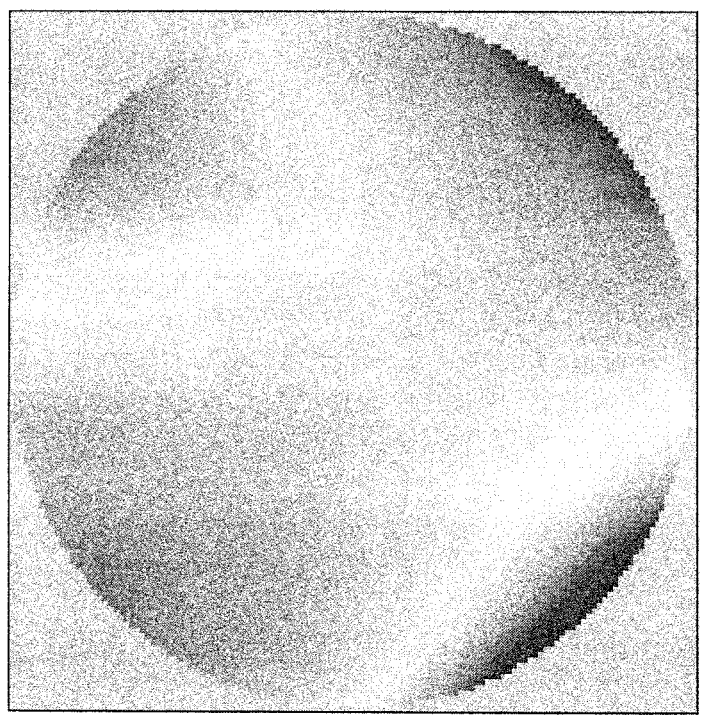
FIG. 8 illustrates the phase function of the second Zernike phase plate according to the first preferred embodiment of the present invention.
Figure 8:
Figure 12:
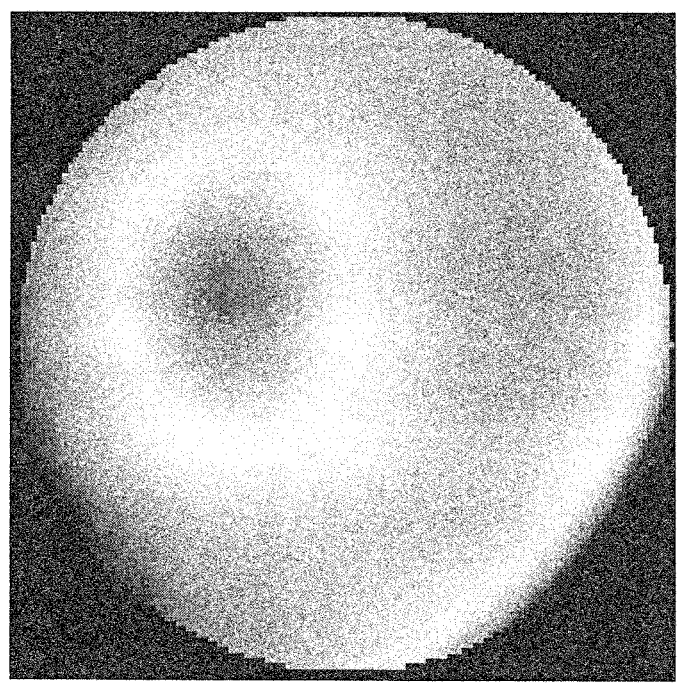
FIG. 12 illustrates the residual subaperture aberration of the inner circle on the aspheric convex asphere according to the first preferred embodiment of the present invention.
Figure 12:
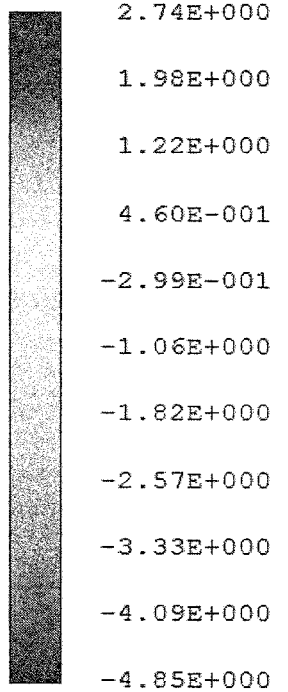
Figure 13:
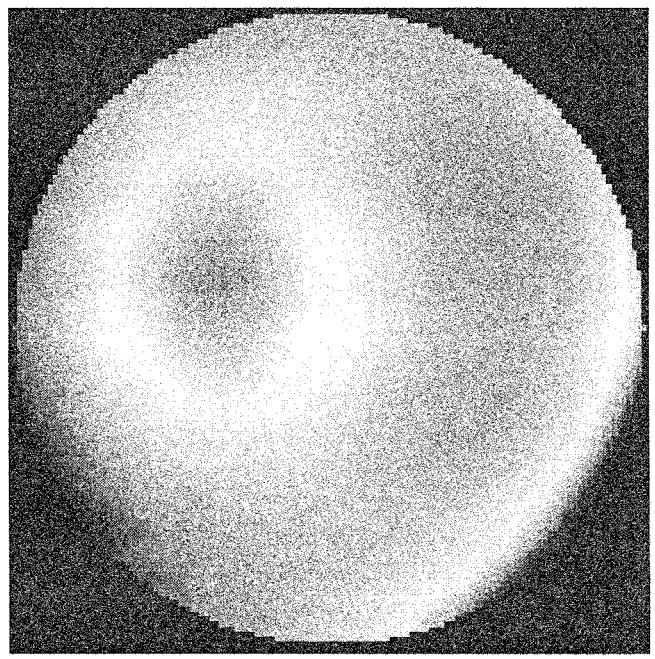
FIG. 13 illustrates the residual subaperture aberration of the middle circle on the aspheric convex asphere according to the first preferred embodiment of the present invention.
Figure 13:
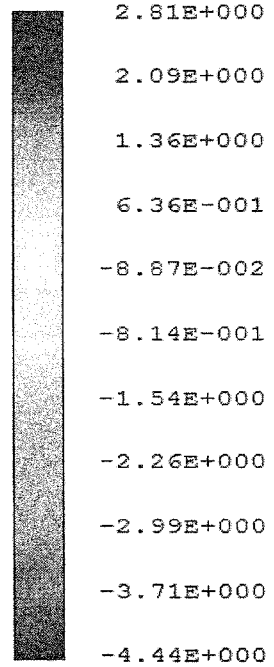
Figure 14:
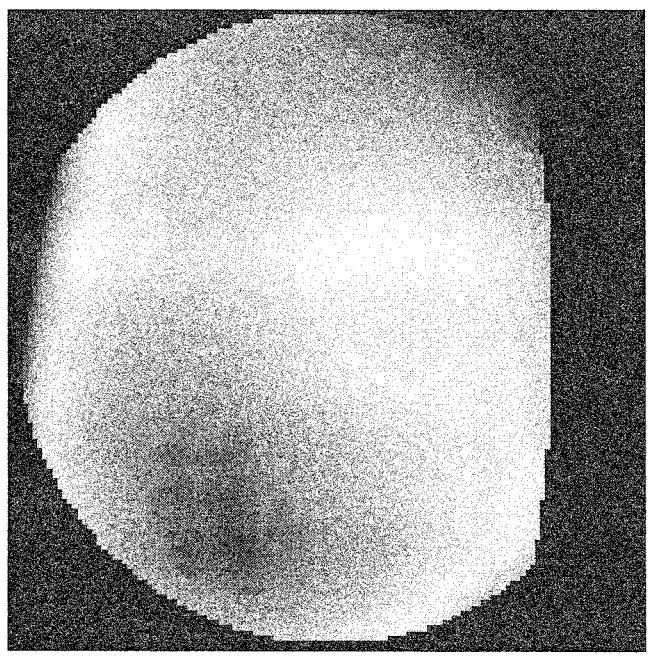
FIG. 14 illustrates the residual subaperture aberration of the outmost circle on the aspheric convex asphere according to the first preferred embodiment of the present invention.
Figure 14:
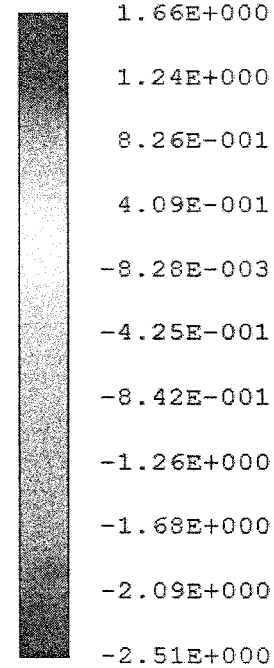

FIG. 7 and FIG. 8 illustrate the phase function of the first phase plate 111 and the second phase plate 112 respectively. The clockwise rotating angle for the first phase plate 111 around its optical axis is γi and the counter-clockwise rotating angle for the second phase plate 112 around its optical axis is also γi. Since the near-null compensator is not necessary to completely compensate the aberrations of the subapertures, the optical path of the test beam passing through phase plate is different than the optical path of the test beam which is reflected from the aspheric subapertures of the aspheric test mirror and then passes through the phase plate again. Therefore, according to the aberrations of the subaperture, the rotating angles may be adjusted so as to tune to reduce the residual aberrations of the subaperture. For example, the rotating angles γi for the three circles of subapertures of the convex hyperbolic SiC mirror are $1.8°$, $7.4°$ and $17.9°$, respectively, which ensures the residual aberrations are all less than 8 waves after compensation and within the vertically measuring range of the wavefront interferometer, as shown in FIG. 12 to FIG. 14 of the drawings.

When the near-null compensator is applied to the central subaperture of the aspheric surface, the rotating angles for the two phase plates should be 0, which does not generate coma and astigmatism and has no compensation effect of the subaperture aberrations. However, the aberrations of the central subaperture are generally small enough to be resolved directly by the wavefront interferometer. For example, the aberrations of the central subaperture (referred to subaperture number 1 in FIG. 4) of the convex hyperbolic SiC mirror has less than 1 interference fringe.

The Zernike phase plates of the near-null compensator can be realized by CGHs, wherein the main pattern of CGHs can be used for aberration compensation, and other alignment patterns are also easily to be fabricated on the same substrate so as to align the initial position regard to two phase plates and the wavefront interferometer, and also align the initial position of two phase plates, and then improve the measuring accuracy. As shown in FIG. 2, the main pattern is fabricated on the central part 1111 of the first phase plate and the central part 1121 of the second phase plate. The alignment pattern is fabricated on the marginal part 1112 of the first phase plate and the marginal part 1122 of the second phase plate.

The testing beam is provided to pass through the pair of phase plates 11 twice time so as to process the optical surface testing. However, it is necessary to solve the problems about the efficiency of diffraction and disturbance order. The current fabrication process of diffraction optical elements can solve the above mentioned problem. For example, phase-type CGHs with adjustable optimized etching depths and duty circles are suggested to get the optimal efficiency of diffraction. When the etching depth is half of the wavelength, and duty circle equals 0.5, up to 40% of the diffraction efficiency is achieved at +1st order which is widely used in the present invention. Consequently, the diffraction efficiency is reduced to 2.56% after the testing beam passing through the pair of phase plates 11 twice time, wherein after the testing beam is reflected by the uncoated glass materials, the reflectivity of the testing beam which returns back to the wavefront interferometer reduces to 0.1%. The contrast of the interference fringe is still acceptable for the standard wavefront interferometer and will be better for silicon carbide aspheric test mirrors or coated mirrors (for example, a standard wavefront interferometer from Zygo Corp. is able to measure surfaces with the reflectivity between 0.1% to 40%). Moreover, multilevel CGH can be used to further enhance the efficiency from 40% to 80%. In order to separate disturbance orders of diffraction, a tilt and/or defocusing carrier frequency can be introduced.

Second Preferred Embodiment

The convex hyperbolic SiC mirror is embodied as an example. A method for measuring the deviation of the surface figure by subaperture stitching with the figure metrology apparatus according to the second preferred embodiment of the present invention comprising the steps of:

(1) Mount the aspheric test mirror 3 on the test mirror mount 31. As shown in FIG. 4, the aspheric test mirror 3 is divided into a certain number of overlapping subapertures, as shown in FIG. 3.

(2) Measure the central subaperture on the aspheric test mirror 3. By adjusting the mechanical adjustment component for the wavefront interferometer 22, the mechanical adjustment component for the near-null compensator 12, and the mechanical adjustment component for the test mirror 32, wherein the test beam emitted from the wavefront interferometer 21 is aligned to illuminate the central subaperture of the aspheric test mirror 3 after passing through the near-null compensator 1. At this time, the readout for all motion axes for all mechanical adjustment component are set as zero while the rotating angle of the first precision rotary center-through table 131 and the second precision rotary center-through table 132 for the phase plates 11 are set as zero also. As a result, the near-null compensator 1 does not generate coma and astigmatism. (The value of coma and astigmatism are zero) The records of the motion axes parameters of all mechanical adjustment components are saved along with the data from subaperture measurements of the wavefront interferometer 21, which can be used for a subaperture stitching processing method later.

(3) Measure an off-axis subaperture. By adjusting X-axis component 222 of the mechanical adjustment component for the interferometer 22 and the yawing table 224, the test beam emitted from the wavefront interferometer 21 is aligned to illuminate the inner circle off-axis subaperture of the aspheric test mirror 3 along the x direction after passing through the near-null compensator 1 with off-axis distance $d_0$=51.1821 mm. Then, the first precision rotary center-through table 131 and the second precision rotary center-through table 132 are adjusted to reversely rotate with each other by the same amount of angle $\gamma$=1.8° (two phase plates rotate with the same amount of angle and in the reverse direction), and then the near-null compensator 1 generates certain amounts of coma and astigmatism so as to correct most of the subaperture aberrations of the inner circle off-axis subapertures. Therefore, the residual aberration is reduced within the vertically measuring range of the wavefront interferometer 21. The records of the motion axes parameters of all mechanical adjustment components are saved along with the data from subaperture measurements of the wavefront interferometer 21, which are used for subaperture stitching processing method.

(4) Measure off-axis subapertures with the inner circle off-axis subaperture: By adjusting the mechanical adjustment component for the aspheric test mirror 32, the aspheric test mirror 3 is rotated around its optical axis by 60°. The test beam emitted from the wavefront interferometer 21 is aligned to illuminate the angularly evenly distributed subapertures on the inner circle after passing through the near-null compensator 1. The records of the motion axes parameters of all mechanical adjustment components are saved along with the data from subaperture measurements of the wavefront interferometer 21, which are used for subaperture stitching processing method. Repeat this step until all off-axis subapertures on the inner circle are measured.

(5) Measure remaining subapertures: Repeat steps (3) and (4). The test beam emitted from the wavefront interferometer 21 is aligned to illuminate other subapertures on the aspheric test mirror 3 after passing through the near-null compensator 1. The records of the motion axes parameters of the mechanical adjustment components are saved along with the data from subaperture measurements of the wavefront interferometer 21, which are used for subaperture stitching processing method.

(6) Stitching: According to the saved motion axes parameters and data from subaperture measurements during steps (2)-(5), the subaperture data are processed with a stitching algorithm and yield the deviation of the surface figure of the aspheric test mirror 3.

Figure 6:
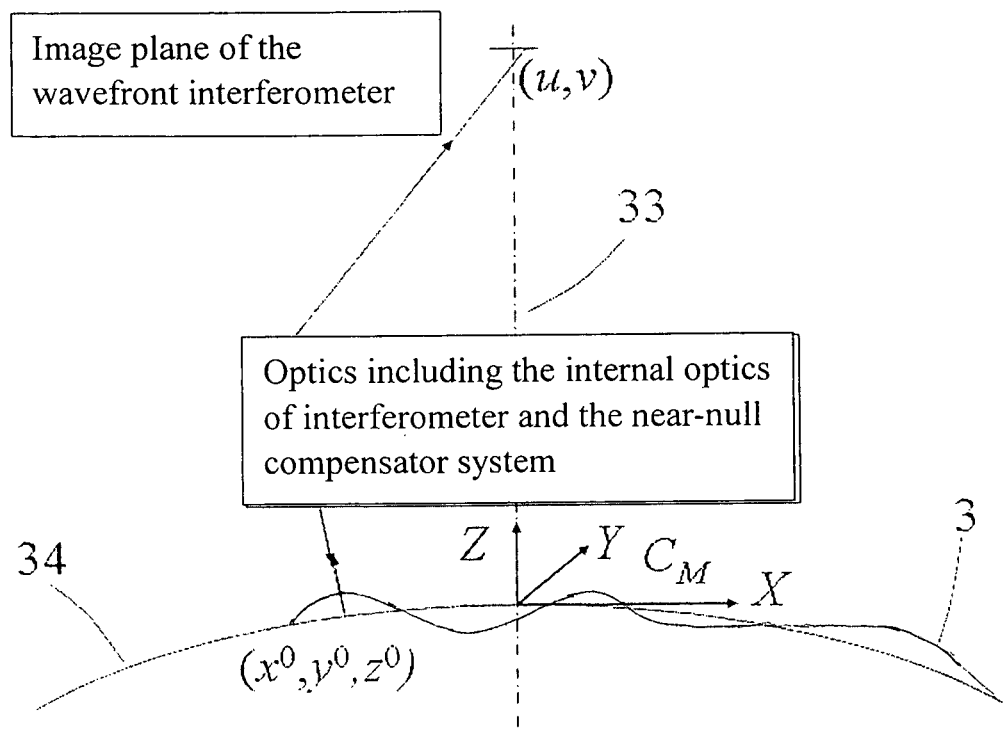
FIG. 6 is a schematic depiction for determining relative coordinates of subaperture by ray tracing according to a second preferred embodiment of the present invention.

In the above step (6) according to the second preferred embodiment of the present invention, the subaperture stitching processing method comprises the steps of:

Step 1: Define the subaperture measurements data as an equation of $W_i = \{w_{j,i} = (u_{j,i}, v_{j,i}, \phi_{j,i})\}$, i=1, 2, ..., s, j=1, 2, ..., $N_i$, wherein s is the number of subapertures, $N_i$ is the number of measuring points of subaperture i, $\phi_{j,i}$ is half of the difference of the optical path measured on the pixel ($u_{j,i}$, $v_{j,i}$). By utilizing the Zemax model via ray tracing as shown in FIG. 5, the lateral coordinates ($x^o_{j,i}$, $y^o_{j,i}$) in the model frame are determined corresponding to the pixel ($u_{j,i}$, $v_{j,i}$) in the subaperture measurements, as shown in FIG. 6. The model frame $C_M$ is attached to the vertex of the nominal model 34 of the aspheric test mirror 3 with Z-axis coinciding with the optical axis 33 of the aspheric test mirror 3. Then, the surface sag $z^o_{j,i}$ at the point ($x^o_{j,i}$, $y^o_{j,i}$) is calculated by using the surface equation of the aspheric test mirror 3, and the coordinates of the measuring point on the real test surface are given as follows:

$$[x_{j,i}, y_{j,i}, z_{j,i}]^T = [x^o_{j,i}, y^o_{j,i}, z^o_{j,i}]^T + [\phi_{j,i} - a_{j,i} + r_i(u_{j,i}^2 + v_{j,i}^2) - z_{j,i}] \cdot n_{j,i}$$

wherein $n_{j,i}$ is the unit normal vector at the point ($x^o_{j,i}$, $y^o_{j,i}$, $z^o_{j,i}$) on the nominal model 34 of the aspheric test mirror 3, wherein $r_i$ is the defocusing coefficient of subaperture i to be determined by the optimization algorithm, and wherein $a_{i,j}$ is the residual aberration of subapertures after be compensating by the near-null compensator as shown in FIG. 12 to FIG. 14. $Z_{j,i}$ is the aberration induced by the misalignment of the near-null compensator 1 and represented by Zernike polynomials. For subapertures on the same circle, the aberrations thereof are identical owning to the identical misalignment of the near-null compensator 1, such that the coefficients for the Zernike polynomials are also identical. In other words, the coefficients of the Zernike polynomials for subapertures on different circles are different. According to the convex hyperbolic SiC mirror as an example, four sets of coefficients are used in Zernike polynomials for each circle of the off-axis subaperture, such as the central subapertures, the inner circle off-axis subaperture, the middle circle off-axis subaperture and the outmost circle off-axis subaperture. All coefficients of Zernike polynomials are to be determined by the optimization algorithm.

Step 2: Define an equation of $f_i w_{j,i} = [x_{j,i}{}^M y_{j,i}{}^M z_{j,i}{}^M 1]^T = g_i^{-1}[x_{j,i}, y_{j,i}, z_{j,i}, 1]^T$, wherein $$g_i = \exp\left(\sum_{t=1}^{6} m_{t,i} \hat{\xi}_t\right)$$

is the six degrees-of-freedom configuration matrix. The configuration is initially determined by the subaperture layout in FIG. 4, and then optimized by the optimization algorithm. In addition, the overlapping region among the subapertures can be determined by using the coordinates $(x^M_{j,i}, y^M_{j,i}, z^M_{j,i})$ (Referred to Chen et al., "Iterative algorithm for subaperture stitching interferometry for general surfaces," J. Opt. Soc. Am. A 22(9): 1929-1936, 2005).

Step 3: Calculate the overlapping deviations:

$$\sigma_o^2 = \sum_{i=1}^{s-1} \sum_{k=i+1}^{s} \sum_{jo=1}^{ik N_o} (\langle f_k \cdot {}^{ik}w_{jo,k} - {}^{ik}h_{jo,k}, {}^{ik}n_{jo,k}\rangle -$$
$$\langle f_i \cdot {}^{ik}w_{jo,i} - {}^{ik}h_{jo,k}, {}^{ik}n_{jo,k}\rangle)^2 / N_o,$$

wherein ${}^{ik}h_{jo,k}$ are projection of the projection point the nominal model 34 of the aspheric test mirror 3 from the measuring point of the overlapping regions for the subaperture i and subaperture k, and ${}^{ik}n_{jo,k}$ are projection of the unit normal vector for the projection point ${}^{ik}h_{jo,k}$. By solving the above mentioned equation, the overlapping deviations are minimized and yield the new configuration matrix $g_i$ and defocusing coefficient $r_i$. It can be solved as a linear least-squares equation after linearization.

Then, repeat the above Steps 2 and 3 of this embodiment, that is, the overlapping region under new configurations can be determined alternatingly and then solve the least-squares equation for new overlapping regions. After the iterative optimization process, the optimal configuration matrix $g_i$ and defocusing coefficient $r_i$ finally yields. Therefore, all measurements of subaperture are correctly transformed into the model frame and then obtain the surface figure deviation of the full aperture of the aspheric test mirror. (Referred to Chen et al., "Iterative algorithm for subaperture stitching test with spherical interferometers," J. Opt. Soc. Am. A 23(5): 1219-1226, 2006).

According to the above preferred embodiments of the present invention, the following remarks are also important:

1. Because the wavefront interferometry is very sensitive to environmental changes, the figure metrology apparatus of the present invention is preferably built on a vibration-isolated table. For example, the figure metrology apparatus is placed on the air-bearing optical bench arranged on the vibration-isolated ground base. Meanwhile, in order to ensure the accuracy of measurement, it is necessary to control the temperature and humidity of the measuring regions, and isolate the air turbulence thereof.

2. According to the above preferred embodiments of the present invention, the wavefront interferometer 21 of the figure metrology apparatus is placed along horizontal optical axis and the aspheric test mirror 3 is also placed along horizontal optical axis which can be modified in other embodiments. For example, the optical axes of the wavefront interferometer 21 and the test mirror 3 can both be placed in vertical-direction, which may be preferable for the aspheric test mirrors 3 having larger aperture or larger mass. The kinematic configuration of the mechanical adjustment component for the interferometer 22 and the mechanical adjustment component for the test mirror 32 can also be modified. For example, the three-axis translation stage for the wavefront interferometer 21 can be placed beneath the rotary table for the test mirror 3 so as to provide the adjustment of three-axis translation for the aspheric test mirror 3 and the rotary table thereof. Likewise, the yawing table 224 of the wavefront interferometer 21 can be placed beneath the rotary table for the test mirror 3 so as to to provide the yawing adjustment for the aspheric test mirror 3. The kinematic configuration of the wavefront interferometer 21 and the near-null compensator 1 does not change.

3. Basically the optical layout involves three parts, which are the wavefront interferometer 21, the near-null compensator 1 and the aspheric test mirror 3. Besides the motor-driven axes, any part of the present invention may require manually fine tuning mechanical adjustment components so as to initially align the optical layout. For example, it is common to use a tip-tilt mechanism for the aspheric test mirror.

It will thus be seen that the objects of the present invention have been fully and effectively accomplished. The embodiments have been shown and described for the purposes of illustrating the functional and structural principles of the present invention includes all modifications encompassed within the spirit and scope of the following claims.

What is claimed is:

1. A near-null compensator for subaperture stitching interferometry of aspheric surfaces, comprising:
   a pair of counter-rotating computer-generated hologram phase plates, wherein each of said phase plates has a phase function comprising two terms Z5 and Z7 of Zernike polynomials:

$$\begin{cases} aZ_5 = a\rho^2 \sin(2\theta) \\ bZ_7 = b(3\rho^2 - 2)\rho\sin\theta \end{cases};$$

wherein $\rho$ is pupil coordinate of normalized radial, $\theta$ is pupil coordinate of angular angle, and a is a coefficient of $Z_5$ polynomials and b is a coefficient of $Z_7$ polynomials; wherein said a of each of said two phase plates are contrary numbers and said b of each of said two phase plates are contrary numbers, and said coefficients a and b are determined by aberrations of off-axis subapertures; and said phase plates are mounted on a pair of precision rotary center-through tables while rotational axes said of precision rotary center-through tables coincide with optical axes of said phase plates.

2. A figure metrology apparatus for subaperture stitching interferometry of aspheric surfaces, comprising:
a wavefront interferometer, a mechanical adjustment component for said wavefront interferometer, a test mirror mount, a mechanical adjustment component for a test mirror, a near-null compensator, and a mechanical adjustment component for said near-null compensator, wherein said wavefront interferometer is mounted on said mechanical adjustment component for said wavefront interferometer, wherein said test mirror mount is mounted on said mechanical adjustment component for said test mirror, wherein said near-null compensator is mounted on said mechanical adjustment component for said near-null compensator and is located between said wavefront interferometer and said test mirror mount, wherein said near-null compensator comprises a pair of counter-rotating computer-generated hologram phase plates mounted on a pair of precision rotary center-through tables while rotational axes of said precision rotary center-through tables coincide with optical axes of said phase plates.

3. The figure metrology apparatus for subaperture stitching interferometry of aspheric surfaces, as recited in claim 2, wherein said mechanical adjustment component for said interferometer comprises a spatially orthogonal three-axes translation stage and a yawing table mounted on said three-axes translation stage.

4. The figure metrology apparatus for subaperture stitching interferometry of aspheric surfaces, as recited in claim 3, wherein said mechanical adjustment component for said near-null compensator comprises a translation stage mounted on said yawing table and arranged along the direction of an optical axis of said wavefront interferometer.

5. The figure metrology apparatus for subaperture stitching interferometry of aspheric surfaces, as recited in claim 2, wherein said mechanical adjustment component for said test mirror comprises a precision rotary table, wherein a rotational axis of said precision rotary table coincides with an optical axis of said test mirror mounted on said test mirror mount.

6. The figure metrology apparatus for subaperture stitching interferometry of aspheric surfaces, as recited in claim 3, wherein said mechanical adjustment component for said test mirror comprises a precision rotary table, wherein a rotational axis of said precision rotary table coincides with an optical axis of said test mirror mounted on said test mirror mount.

7. The figure metrology apparatus for subaperture stitching interferometry of aspheric surfaces, as recited in claim 4, wherein said mechanical adjustment component for said test mirror comprises a precision rotary table, wherein a rotational axis of said precision rotary table coincides with an optical axis of said test mirror mounted on said test mirror mount.

8. A method for measuring aspheric surfaces by subaperture stitching with said figure metrology apparatus as recited in claim 4, comprising the steps of:
(a) mounting an aspheric test mirror on said test mirror mount, wherein said aspheric test mirror is divided into a certain number of overlapping subapertures;
(b) measuring an individual subaperture, wherein by adjusting said mechanical adjustment component for said wavefront interferometer, said mechanical adjustment component for said near-null compensator, and said mechanical adjustment component for said test mirror, a test beam emitted from said wavefront interferometer is passing through said near-null compensator and is aligned to illuminate an individual subaperture, wherein counter-rotating angles of said phase plates are adjusted via said precision rotary center-through tables and then said near-null compensator generates certain amounts of coma and astigmatism so as to correct most of the subaperture aberrations, wherein the residual aberrations of subaspertures are reduced within the vertically measuring range of said wavefront interferometer, and the records for the parameters of motion axes of said mechanical adjustment components are saved along with the data from subaperture measurements;
(c) measuring all subapertures one by one, wherein according to the step (b), all other subapertures at different locations on said aspheric test mirror are measured; and
(d) stitching that according to said saved motion axes parameters and said data from subaperture measurements on the steps (b) and (c), said data from subaperture measurement are processed with a stitching algorithm and then yield the deviation of a surface figure of said aspheric test mirror.

9. The method for measuring aspheric surfaces by subaperture stitching with said figure metrology apparatus, as recited in claim 8, wherein rotating angles of each of said phase plates are adjusted to keep consistent but with the opposite directions, in the steps of (b) and (c).

10. The method for measuring aspheric surfaces by subaperture stitching with said figure metrology apparatus, as recited in claim 8, wherein a subaperture data processing method comprises the steps of:
(i) recognizing mathematical relations between said data from subaperture measurements and the sum square of the overlapping deviations by combining the ray tracing and rigid-body transformation; and
(ii) determining the optimal six degree-of-freedom configuration parameters and the power coefficients so as to minimize said sum square of the overlapping deviations by iterative optimization and then obtain said deviation of said surface figure of said aspheric test mirror.

11. The method for measuring aspheric surfaces by subaperture stitching with said figure metrology apparatus, as recited in claim 9, wherein a subaperture data processing method comprises the steps of:
(i) recognizing mathematical relations between said data from subaperture measurements and the sum square of the overlapping deviations by combining the ray tracing and rigid-body transformation; and
(ii) determining the optimal six degree-of-freedom configuration parameters and the power coefficients so as to minimize said sum square of the overlapping deviations by iterative optimization and then obtain said deviation of said surface figure of said aspheric test mirror.

12. The method for measuring aspheric surfaces by subaperture stitching with said figure metrology apparatus, as recited in claim 8, wherein said step of measuring an individual subaperture is able to apply to the central subaperture of said aspheric test mirror and each of off-axis subapertures of said aspheric test mirror.

13. The method for measuring aspheric surfaces by subaperture stitching with said figure metrology apparatus, as recited in claim 9, wherein said step of measuring an individual subaperture is able to apply to the central subaperture of said aspheric test mirror and each of off-axis subapertures of said aspheric test mirror.

14. The method for measuring aspheric surfaces by subaperture stitching with said figure metrology apparatus, as recited in claim 8, wherein said step of measuring all subapertures one by one is applied to test all subapertures of said aspheric test mirror one by one and circle by circle in an order from the central subapertures, inner circle subapertures, middle circles subapertures, and outmost circles subaperture.

15. The method for measuring aspheric surfaces by subaperture stitching with said figure metrology apparatus, as recited in claim 9, wherein said step of measuring all subapertures one by one is applied to test all subapertures of said aspheric test mirror one by one and circle by circle in an order from the central subapertures, inner circle subapertures, middle circles subapertures, and outmost circles subaperture.

16. A method for measuring aspheric surfaces by subaperture stitching with said figure metrology apparatus as recited in claim 5, comprising the steps of:
   (a) mounting an aspheric test mirror on said test mirror mount, wherein said aspheric test mirror is divided into a certain number of overlapping subapertures;
   (b) measuring an individual subaperture, wherein by adjusting said mechanical adjustment component for said wavefront interferometer, said mechanical adjustment component for said near-null compensator, and said mechanical adjustment component for said test mirror, a test beam emitted from said wavefront interferometer is passing through said near-null compensator and is aligned to illuminate an individual subaperture, wherein counter-rotating angles of said phase plates are adjusted via said precision rotary center-through tables and then said near-null compensator generates certain amounts of coma and astigmatism so as to correct most of the subaperture aberrations, wherein the residual aberrations of subaspertures are reduced within the vertically measuring range of said wavefront interferometer, and the records for the parameters of motion axes of said mechanical adjustment components are saved along with the data from subaperture measurements;
   (c) measuring all subapertures one by one, wherein according to the step (b), all other subapertures at different locations on said aspheric test mirror are measured; and
   (d) stitching that according to said saved motion axes parameters and said data from subaperture measurements on the steps (b) and (c), said data from subaperture measurement are processed with a stitching algorithm and then yield the deviation of a surface figure of said aspheric test mirror.

17. The method for measuring aspheric surfaces by subaperture stitching with said figure metrology apparatus, as recited in claim 16, wherein rotating angles of each of said phase plates are adjusted to keep consistent but with the opposite directions, in the steps of (b) and (c).

18. The method for measuring aspheric surfaces by subaperture stitching with said figure metrology apparatus, as recited in claim 16, wherein a subaperture data processing method comprises the steps of:
   (i) recognizing mathematical relations between said data from subaperture measurements and the sum square of the overlapping deviations by combining the ray tracing and rigid-body transformation; and
   (ii) determining the optimal six degree-of-freedom configuration parameters and the power coefficients so as to minimize said sum square of the overlapping deviations by iterative optimization and then obtain said deviation of said surface figure of said aspheric test mirror.

19. The method for measuring aspheric surfaces by subaperture stitching with said figure metrology apparatus, as recited in claim 17, wherein a subaperture data processing method comprises the steps of:
   (i) recognizing mathematical relations between said data from subaperture measurements and the sum square of the overlapping deviations by combining the ray tracing and rigid-body transformation; and
   (ii) determining the optimal six degree-of-freedom configuration parameters and the power coefficients so as to minimize said sum square of the overlapping deviations by iterative optimization and then obtain said deviation of said surface figure of said aspheric test mirror.

20. The method for measuring aspheric surfaces by subaperture stitching with said figure metrology apparatus, as recited in claim 16, wherein said step of measuring an individual subaperture is able to apply to the central subaperture of said aspheric test mirror and each of off-axis subapertures of said aspheric test mirror.

21. The method for measuring aspheric surfaces by subaperture stitching with said figure metrology apparatus, as recited in claim 17, wherein said step of measuring an individual subaperture is able to apply to the central subaperture of said aspheric test mirror and each of off-axis subapertures of said aspheric test mirror.

22. The method for measuring aspheric surfaces by subaperture stitching with said figure metrology apparatus, as recited in claim 16, wherein said step of measuring all subapertures one by one is applied to test all subapertures of said aspheric test mirror one by one and circle by circle in an order from the central subapertures, inner circle subapertures, middle circles subapertures, and outmost circles subaperture.

23. The method for measuring aspheric surfaces by subaperture stitching with said figure metrology apparatus, as recited in claim 17, wherein said step of measuring all subapertures one by one is applied to test all subapertures of said aspheric test mirror one by one and circle by circle in an order from the central subapertures, inner circle subapertures, middle circles subapertures, and outmost circles subaperture.

24. A method for measuring aspheric surfaces by subaperture stitching with said figure metrology apparatus as recited in claim 6, comprising the steps of:
   (a) mounting an aspheric test mirror on said test mirror mount, wherein said aspheric test mirror is divided into a certain number of overlapping subapertures;
   (b) measuring an individual subaperture, wherein by adjusting said mechanical adjustment component for said wavefront interferometer, said mechanical adjustment component for said near-null compensator, and said mechanical adjustment component for said test mirror, a test beam emitted from said wavefront interferometer is passing through said near-null compensator and is aligned to illuminate an individual subaperture, wherein counter-rotating angles of said phase plates are adjusted via said precision rotary center-through tables and then said near-null compensator generates certain amounts of coma and astigmatism so as to correct most of the subaperture aberrations, wherein the residual aberrations of subaspertures are reduced within the vertically measuring range of said wavefront interferometer, and the records for the parameters of motion axes of said mechanical adjustment components are saved along with the data from subaperture measurements;
   (c) measuring all subapertures one by one, wherein according to the step (b), all other subapertures at different locations on said aspheric test mirror are measured; and
   (d) stitching that according to said saved motion axes parameters and said data from subaperture measurements on the steps (b) and (c), said data from subaperture measurement are processed with a stitching algorithm and then yield the deviation of a surface figure of said aspheric test mirror.

25. The method for measuring aspheric surfaces by subaperture stitching with said figure metrology apparatus, as recited in claim 24, wherein rotating angles of each of said phase plates are adjusted to keep consistent but with the opposite directions, in the steps of (b) and (c).

26. The method for measuring aspheric surfaces by subaperture stitching with said figure metrology apparatus, as recited in claim 24, wherein a subaperture data processing method comprises the steps of:
   (i) recognizing mathematical relations between said data from subaperture measurements and the sum square of the overlapping deviations by combining the ray tracing and rigid-body transformation; and
   (ii) determining the optimal six degree-of-freedom configuration parameters and the power coefficients so as to minimize said sum square of the overlapping deviations by iterative optimization and then obtain said deviation of said surface figure of said aspheric test mirror.

27. The method for measuring aspheric surfaces by subaperture stitching with said figure metrology apparatus, as recited in claim 25, wherein a subaperture data processing method comprises the steps of:
   (i) recognizing mathematical relations between said data from subaperture measurements and the sum square of the overlapping deviations by combining the ray tracing and rigid-body transformation; and
   (ii) determining the optimal six degree-of-freedom configuration parameters and the power coefficients so as to minimize said sum square of the overlapping deviations by iterative optimization and then obtain said deviation of said surface figure of said aspheric test mirror.

28. The method for measuring aspheric surfaces by subaperture stitching with said figure metrology apparatus, as recited in claim 24, wherein said step of measuring an individual subaperture is able to apply to the central subaperture of said aspheric test mirror and each of off-axis subapertures of said aspheric test mirror.

29. The method for measuring aspheric surfaces by subaperture stitching with said figure metrology apparatus, as recited in claim 25, wherein said step of measuring an individual subaperture is able to apply to the central subaperture of said aspheric test mirror and each of off-axis subapertures of said aspheric test mirror.

30. The method for measuring aspheric surfaces by subaperture stitching with said figure metrology apparatus, as recited in claim 24, wherein said step of measuring all subapertures one by one is applied to test all subapertures of said aspheric test mirror one by one and circle by circle in an order from the central subapertures, inner circle subapertures, middle circles subapertures, and outmost circles subaperture.

31. The method for measuring aspheric surfaces by subaperture stitching with said figure metrology apparatus, as recited in claim 25, wherein said step of measuring all subapertures one by one is applied to test all subapertures of said aspheric test mirror one by one and circle by circle in an order from the central subapertures, inner circle subapertures, middle circles subapertures, and outmost circles subaperture.

32. A method for measuring aspheric surfaces by subaperture stitching with said figure metrology apparatus as recited in claim 7, comprising the steps of:
   (a) mounting an aspheric test mirror on said test mirror mount, wherein said aspheric test mirror is divided into a certain number of overlapping subapertures;
   (b) measuring an individual subaperture, wherein by adjusting said mechanical adjustment component for said wavefront interferometer, said mechanical adjustment component for said near-null compensator, and said mechanical adjustment component for said test mirror, a test beam emitted from said wavefront interferometer is passing through said near-null compensator and is aligned to illuminate an individual subaperture, wherein counter-rotating angles of said phase plates are adjusted via said precision rotary center-through tables and then said near-null compensator generates certain amounts of coma and astigmatism so as to correct most of the subaperture aberrations, wherein the residual aberrations of subaspertures are reduced within the vertically measuring range of said wavefront interferometer, and the records for the parameters of motion axes of said mechanical adjustment components are saved along with the data from subaperture measurements;
   (c) measuring all subapertures one by one, wherein according to the step (b), all other subapertures at different locations on said aspheric test mirror are measured; and
   (d) stitching that according to said saved motion axes parameters and said data from subaperture measurements on the steps (b) and (c), said data from subaperture measurement are processed with a stitching algorithm and then yield the deviation of a surface figure of said aspheric test mirror.

33. The method for measuring aspheric surfaces by subaperture stitching with said figure metrology apparatus, as recited in claim 32, wherein rotating angles of each of said phase plates are adjusted to keep consistent but with the opposite directions, in the steps of (b) and (c).

34. The method for measuring aspheric surfaces by subaperture stitching with said figure metrology apparatus, as recited in claim 32, wherein a subaperture data processing method comprises the steps of:
   (i) recognizing mathematical relations between said data from subaperture measurements and the sum square of the overlapping deviations by combining the ray tracing and rigid-body transformation; and
   (ii) determining the optimal six degree-of-freedom configuration parameters and the power coefficients so as to minimize said sum square of the overlapping deviations by iterative optimization and then obtain said deviation of said surface figure of said aspheric test mirror.

35. The method for measuring aspheric surfaces by subaperture stitching with said figure metrology apparatus, as recited in claim 33, wherein a subaperture data processing method comprises the steps of:
   (i) recognizing mathematical relations between said data from subaperture measurements and the sum square of the overlapping deviations by combining the ray tracing and rigid-body transformation; and
   (ii) determining the optimal six degree-of-freedom configuration parameters and the power coefficients so as to minimize said sum square of the overlapping deviations by iterative optimization and then obtain said deviation of said surface figure of said aspheric test mirror.

36. The method for measuring aspheric surfaces by subaperture stitching with said figure metrology apparatus, as recited in claim 32, wherein said step of measuring an individual subaperture is able to apply to the central subaperture of said aspheric test mirror and each of off-axis subapertures of said aspheric test mirror.

37. The method for measuring aspheric surfaces by subaperture stitching with said figure metrology apparatus, as recited in claim 33, wherein said step of measuring an individual subaperture is able to apply to the central subaperture of said aspheric test mirror and each of off-axis subapertures of said aspheric test mirror.

38. The method for measuring aspheric surfaces by subaperture stitching with said figure metrology apparatus, as recited in claim 32, wherein said step of measuring all subapertures one by one is applied to test all subapertures of said aspheric test mirror one by one and circle by circle in an order from the central subapertures, inner circle subapertures, middle circles subapertures, and outmost circles subaperture.

39. The method for measuring aspheric surfaces by subaperture stitching with said figure metrology apparatus, as recited in claim 33, wherein said step of measuring all subapertures one by one is applied to test all subapertures of said aspheric test mirror one by one and circle by circle in an order from the central subapertures, inner circle subapertures, middle circles subapertures, and outmost circles subaperture.

* * * * *